US006345436B1

(12) United States Patent
Codrington

(10) Patent No.: US 6,345,436 B1
(45) Date of Patent: Feb. 12, 2002

(54) COMBINATION TORQUE TOOL AND METHOD OF ADJUSTING VALVES AND INJECTORS

(76) Inventor: Ernest Richardson Codrington, 2251 Brisco Court, Coquitlam, British Columbia (CA), V3K 6K4

( * ) Notice: Subject to any disclaimer, the term of this patent is extended or adjusted under 35 U.S.C. 154(b) by 0 days.

(21) Appl. No.: 09/337,647

(22) Filed: Jun. 22, 1999

(51) Int. Cl.[7] .......................... B23D 21/00; B25B 13/48

(52) U.S. Cl. ............................. 29/720; 29/701; 29/219; 29/213.1; 81/9.24; 81/437; 81/473; 81/57.36

(58) Field of Search .......................... 29/888.42, 213.1, 29/215, 219, 720, 714, 701; 81/9.24, 437, 467, 473, 476, 57.22, 57.36

(56) References Cited

U.S. PATENT DOCUMENTS

| | | | | | |
|---|---|---|---|---|---|
| 1,390,071 | A | * | 9/1921 | Wetzstein | 81/888.42 |
| 1,654,319 | A | * | 12/1927 | Brown | 81/888.42 |
| 1,681,881 | A | * | 8/1928 | Shaw | 81/888.42 |
| 2,007,432 | A | | 7/1935 | Mancuso | 81/55 |
| 2,184,394 | A | * | 12/1939 | Moretti | 81/474 |
| 2,194,069 | A | * | 3/1940 | Gagne | 81/888.42 |
| 2,566,543 | A | * | 9/1951 | Weglarz | 81/888.42 |
| 2,599,489 | A | * | 6/1952 | Schmidt | 81/888.42 |
| 2,666,350 | A | * | 1/1954 | Hackett | 81/888.42 |
| 3,487,732 | A | * | 1/1970 | Larson | 81/474 |
| 3,717,053 | A | * | 2/1973 | Sturges | 81/888.42 |
| 4,229,999 | A | * | 10/1980 | Rottigni | 81/888.42 |
| 4,341,292 | A | | 7/1982 | Acevedo | |
| 4,457,416 | A | * | 7/1984 | Kutzler | 192/44 |
| 4,474,059 | A | | 10/1984 | Hoeptner | |
| 4,759,225 | A | * | 7/1988 | Reynertson | 81/479 |
| 4,774,864 | A | * | 10/1988 | Dossier | 81/474 |
| 4,813,312 | A | * | 3/1989 | Wilhelm | 81/467 |
| 4,958,541 | A | | 9/1990 | Annis et al. | 81/479 |
| 5,130,700 | A | | 7/1992 | Annis et al. | 340/665 |
| 5,533,409 | A | | 7/1996 | Crane et al. | 73/862.23 |
| 5,617,766 | A | | 4/1997 | Tsuji et al. | 81/480 |
| 5,813,298 | A | * | 9/1998 | Beattie | 81/476 |
| 5,941,140 | A | * | 8/1999 | Suksi | 81/59.1 |
| 6,070,075 | A | * | 6/2000 | Hinterlechner | 192/12 R |
| 6,076,438 | A | * | 6/2000 | Rahm | 81/473 |
| 6,082,512 | A | * | 7/2000 | Marks | 192/43 |
| 6,086,544 | A | * | 7/2000 | Hibner et al. | 600/568 |
| 6,095,693 | A | * | 8/2000 | Fujiwara | 384/625 |
| 6,112,863 | A | * | 9/2000 | Colletti | 188/77 R |

FOREIGN PATENT DOCUMENTS

| | | |
|---|---|---|
| DE | 19514882 | 10/1996 |
| DE | 19746877 | 4/1998 |

* cited by examiner

*Primary Examiner*—S. Thomas Hughes
*Assistant Examiner*—Marc Jimenez
(74) *Attorney, Agent, or Firm*—Antony C. Edwards

(57) ABSTRACT

A valve adjusting and injector preload tool is provided for an internal combustion engine having a valve opening member with a male threaded member operatively and adjustably contacting the valve. The tool includes a first member engagable with the threaded member for rotating the threaded member towards or away from the valve. There is a knob for rotating the first member in a first rotational direction so the male threaded member moves towards the valve and for rotating the first member in a second rotational direction so the male threaded member moves away from the valve. There is a clutch for stopping movement of the first member, as the male threaded member moves towards the valve, when the male threaded member operatively contacts the valve and takes up play between the valve opening member and the valve. There is a scale for measuring a predetermined amount of rotation of the threaded member, as the threaded member is rotated in the second rotational direction away from the valve, after the male threaded member operatively contacts the valve, and thereby setting a specified amount of play between the valve opening member and the valve. The method involves loosening any lock nut on the male threaded member. The male threaded member is rotated in a first rotational direction towards the valve until the male threaded member operatively contacts the valve. The male threaded member is then rotated in the opposite rotational direction for a specified angle of rotation related to the pitch of the male threaded member, such that a specified clearance is set between the threaded member and the valve.

16 Claims, 6 Drawing Sheets

COMBINATION TORQUE TOOL AND METHOD OF ADJUSTING VALVES AND INJECTORS

BACKGROUND OF THE INVENTION

This invention relates to torque tools and, in particular, to dual or combination torque tools for setting valve clearances on internal combustion engines or other components where feeler gauges are normally used.

Internal combustion engines typically require a specified clearance between the valves and the valve opening mechanisms. Rocker arms are used on many engines to open the valves. One end of each rocker arm engages a camshaft directly, in the case of overhead camshafts, or a push rod in the case of push rod engines. The opposite end of the rocker arm operatively contacts the valve. More specifically, this end of the rocker arm usually has an adjustment screw or bolt. The lower end of the screw or bolt contacts the valve, a cross head for multiple valve engines or other such components associated with the valve. There is usually a lock nut on the top of the screw or bolt above the rocker arm which is tightened to keep the screw or bolt in a desired position. The clearance is set by loosening the lock nut and inserting a feeler gauge between the bottom of the screw or bolt and the valve. The screw or bolt is then tightened or loosened until the mechanic senses the correct amount of drag on the feeler gauge as it is pulled between the screw or bolt and the valve.

After the correct amount of gap is set, the lock nut is tightened. This should be done to a specified torque. However the screw or nut must be held at the rotational position where the gap was set. Accordingly a normal socket-type torque wrench cannot be used since it would interfere with the screwdriver or wrench or the screw or nut. A special crow foot torque wrench is usually used to enable the mechanic to hold the screw or bolt while the lock nut is tightened.

The disadvantage of this technique is not only the requirement for multiple tools. There are also problems in setting the valve clearance within acceptable tolerances. The drag of the feeler gauge may be an acceptable way of measuring the gap for an experienced mechanic when the parts are new. However the task is not as easy for inexperienced personnel, particularly as the parts become worn. They may be pitted or otherwise distorted such that a feeler gauge tends to ride on the rough surfaces instead of measuring the actual gap.

It is therefore an object of the invention to provide an improved apparatus and method for adjusting valves which overcomes deficiencies in the prior art.

It is also an object of the invention to provide an improved apparatus and method for adjusting internal combustion engine valves which does not depend upon the use of feeler gauges or the like.

It is a further object of the invention to provide an improved apparatus and method for adjusting internal combustion engine valves where the bolt or screw on the rocker arm can be rotated with a tool to the required position to set the specified clearance, and the lock nut and can be tightened with the same tool while the bolt or screw is held in the required position.

SUMMARY OF THE INVENTION

There is provided, according to one aspect of the invention, a valve adjusting tool for an internal combustion engine having a valve opening member with a male threaded member operatively and adjustably contacting the valve. The tool includes a first member engagable with the threaded member for rotating the threaded member towards or away from the valve. There is means for rotating the first member in a first rotational direction so the male threaded member moves towards the valve and for rotating the first member in a second rotational direction so the male threaded member moves away from the valve. There is means for stopping movement of the first member, as the first member moves towards the valve, when the male threaded member operatively contacts the valve and thereby takes up play between said valve opening member and the valve. There is means for measuring a predetermined amount of rotation of the threaded member, as the threaded member is rotated in the second rotational direction away from the valve, after having operatively contacted the valve, and thereby setting a specified amount of play between said valve opening member and the valve.

There is provided, according to another aspect of the invention, a method of setting a valve clearance on an internal combustion engine having a rocker arm with a male threaded member operatively contacting a valve. The method includes the steps of loosening any lock nut on the threaded member and rotating the male threaded member in a first rotational direction towards the valve until the male threaded member operatively contacts the valve. The male threaded member is then rotated in a second rotational direction, opposite the first direction, for a specified angle of rotation related to the pitch of the male threaded member, such that a specified clearance is set between the male threaded member and the valve.

DETAILED DESCRIPTION OF THE PREFERRED EMBODIMENTS

Figure 1:
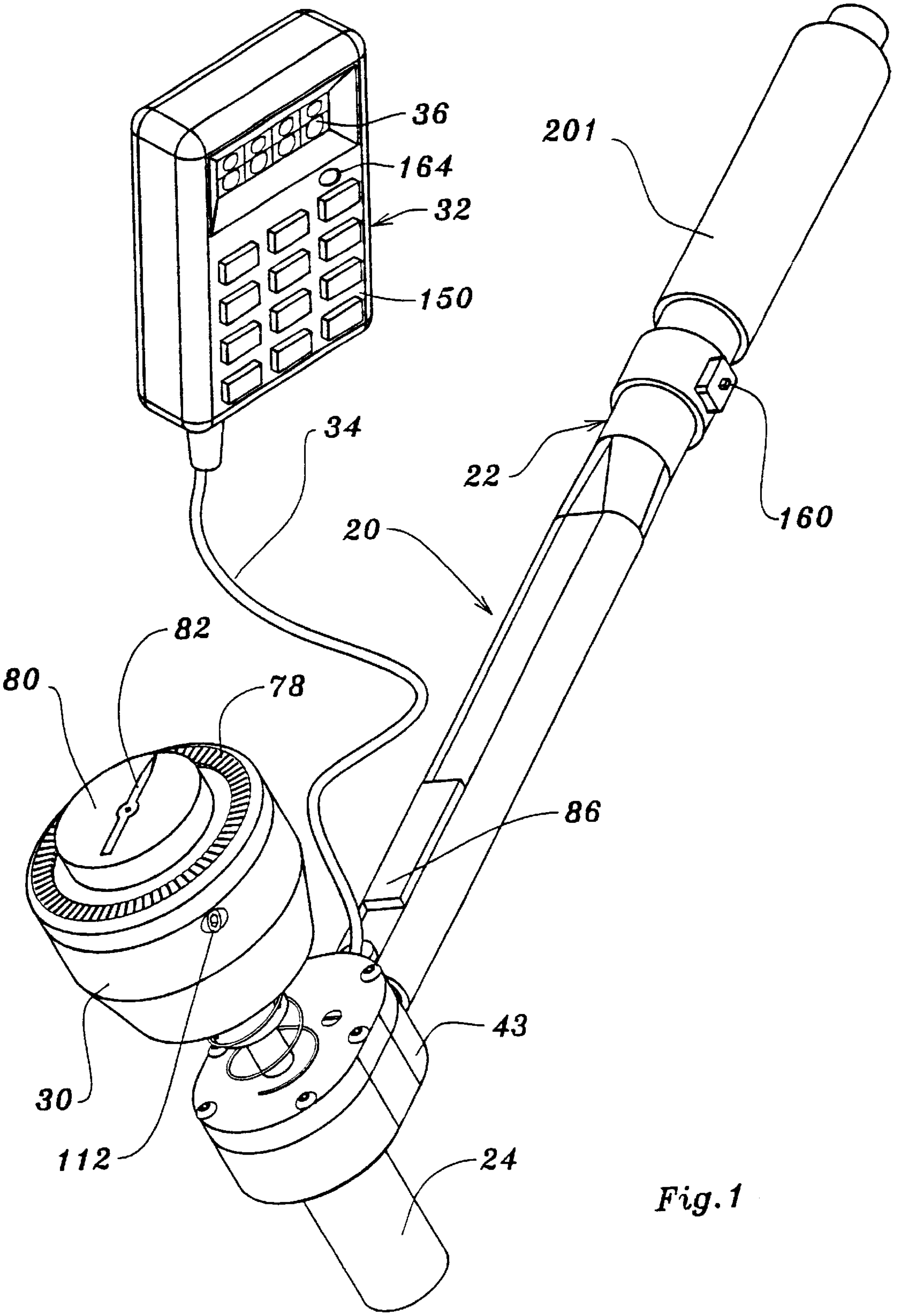
FIG. 1 is an isometric view of a valve adjusting tool, according to an embodiment of the invention.

Referring first to FIG. 1, this shows a tool 20 according to an embodiment of the invention, for setting valve clearances on internal combustion engines. It may also be used for related tasks such as setting injector preload to rocker arm actuated fuel injectors. It includes a handle 22 which is generally similar in configuration to a standard torque wrench. There is a socket 24 which is interchangeable on this embodiment to fit different sized lock nuts on the rocker arms of different engines. The tool includes a setting knob 30 which, as described in more detail below, is used to set the required clearance between the typical screw or nut on the rocker arm and the valve or other component connected to the valve such as a cross head. There is a scale 78 and a needle 82 which are utilized in setting the clearance. FIG. 1 shows an electronic display apparatus 32 which is connected to the tool 20 by a cable 34, to display a reading on LED display panel 36 thereof.

Figure 6:
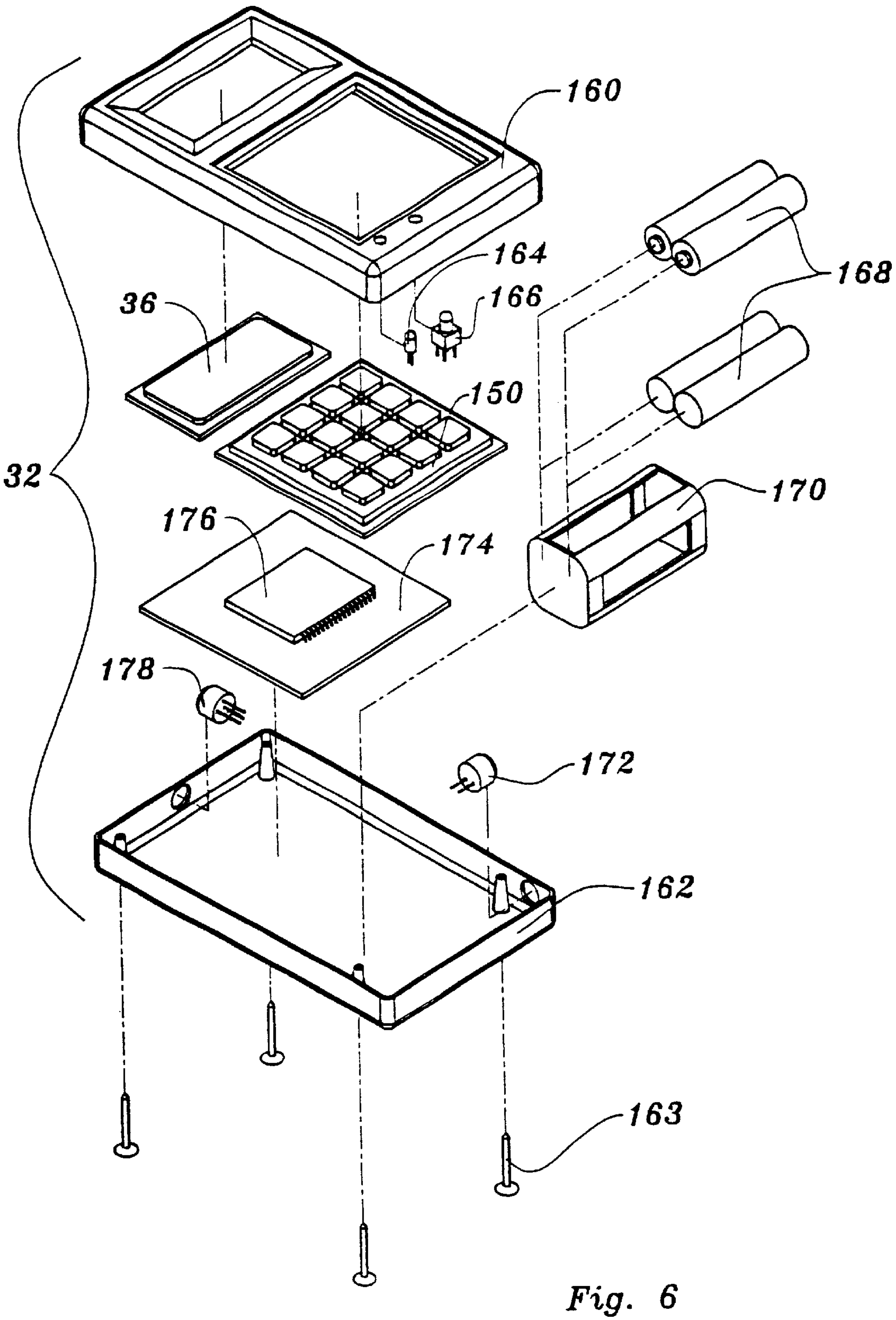
FIG. 6 is an exploded isometric view of the display apparatus of FIG. 1.

In this example the display apparatus 32 has an internal microprocessor and other electronic components as well described below. As seen in FIG. 6 the display apparatus includes a top cover 160 and a bottom cover 162 connected together by screws 163. There is a power on LED 164 and a power on/off switch 166. The unit is powered by batteries 168 in battery case 170. There is an external power connector 172 and a keypad 150. An electronic board 174 includes a processor 176. Connector 178 is provided for a sensor cable 34.

Figure 2:
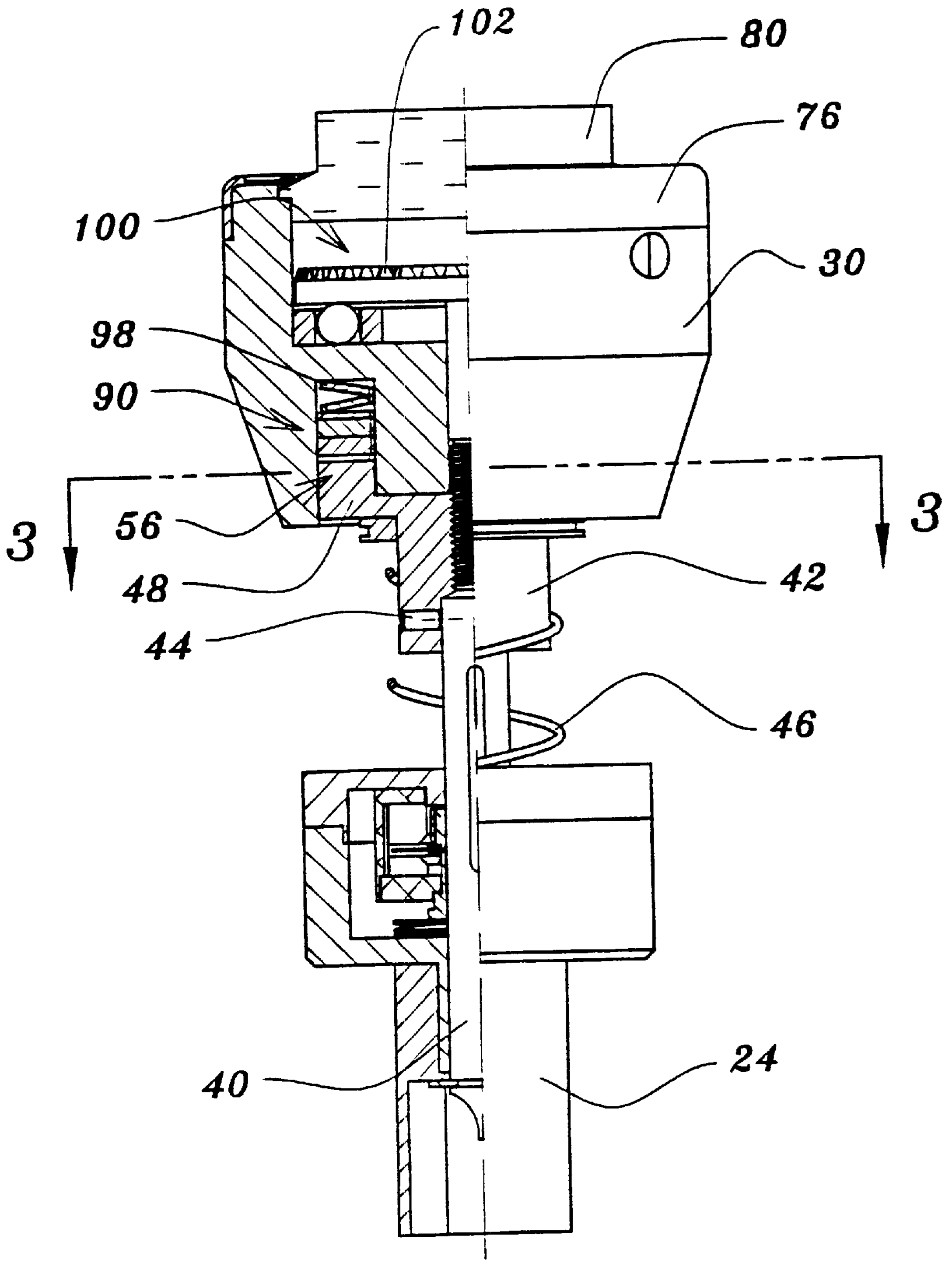
FIG. 2 is an enlarged, fragmentary end view, partly in section, of the tool of FIG. 1*a;*
Figure 4:
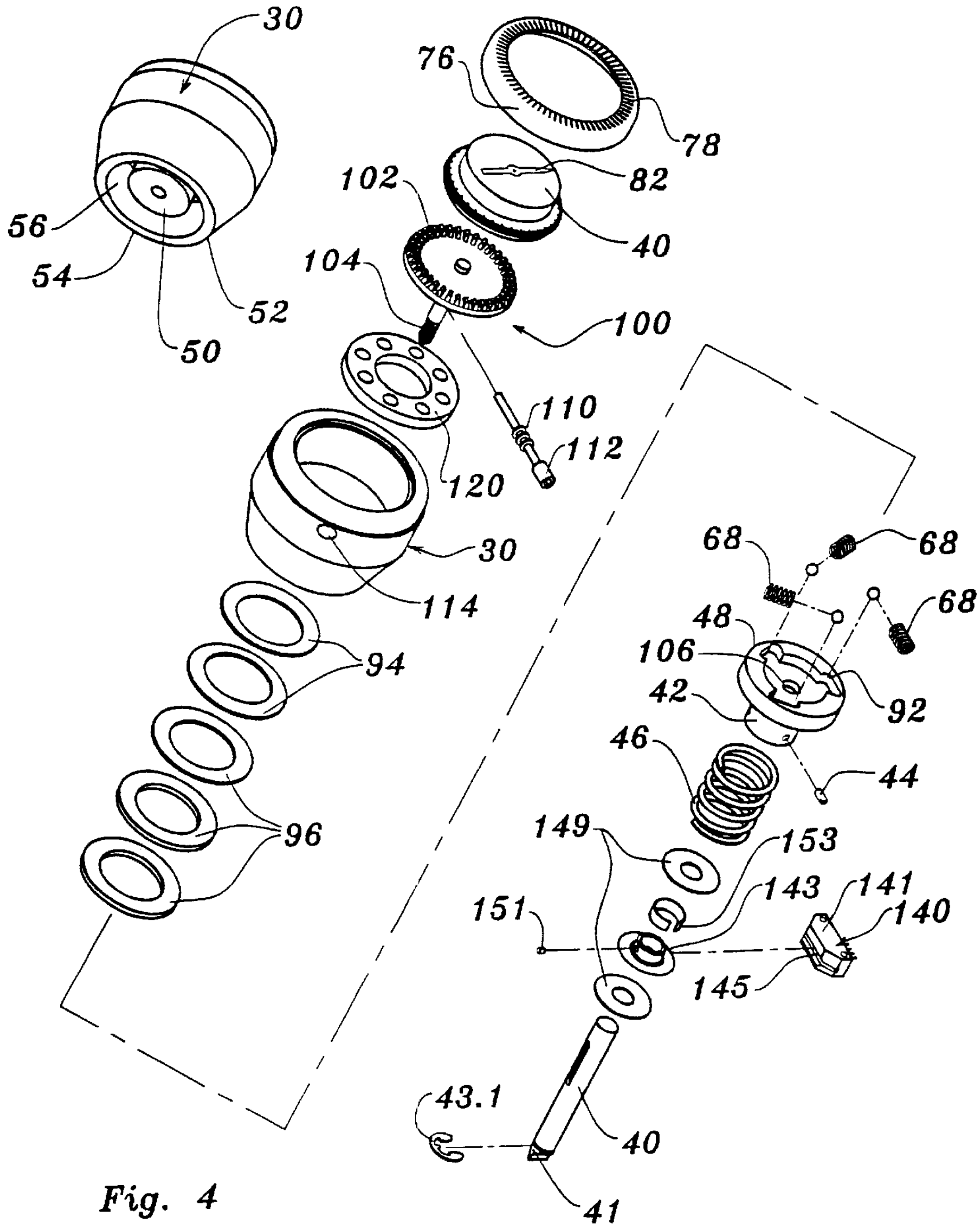
FIG. 4 is an exploded isometric view of the screwdriver, clutch, cam device, setting knob and dial thereof.
Figure 5:
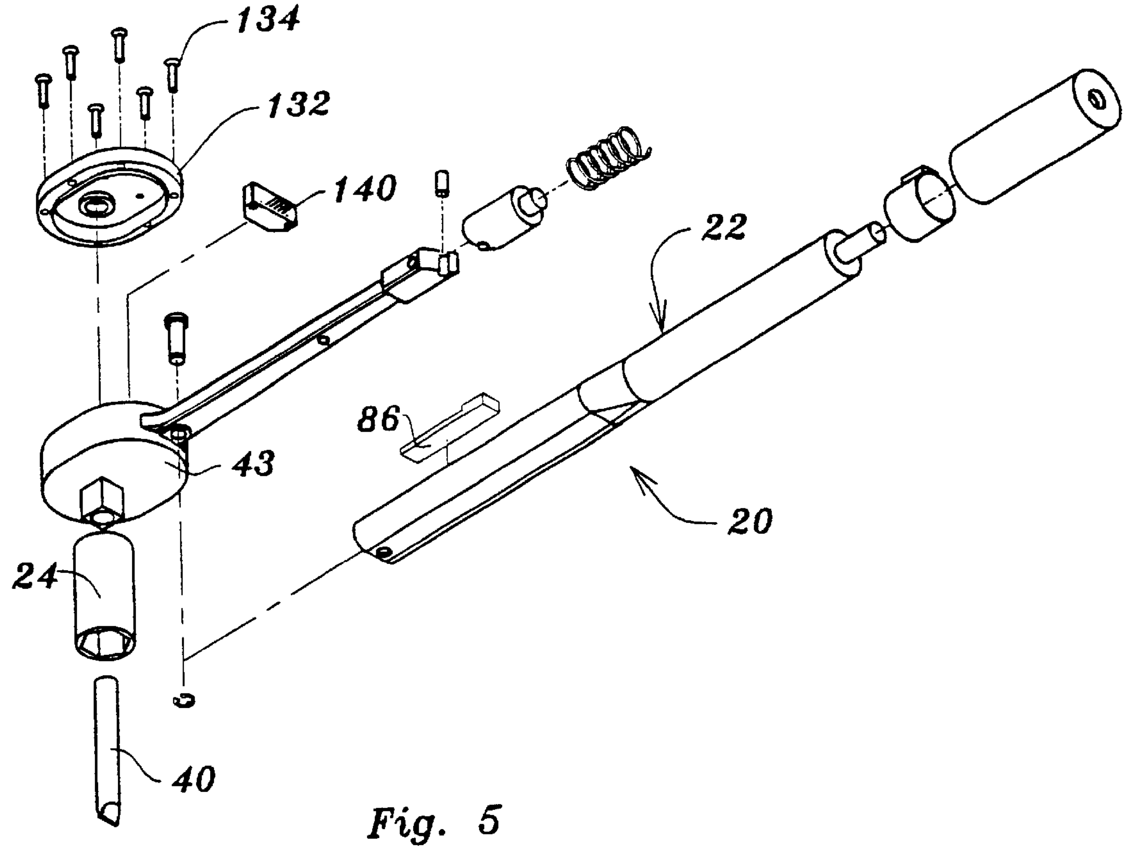
FIG. 5 is an exploded isometric view of the torque wrench portion thereof and the screwdriver.

As seen best in FIGS. 2 and 5, there is a screwdriver bit 40 located coaxially within the socket 24 and rotatable relative to the socket 24. The screwdriver bit is received non-rotatably in a socket 42 extending outwardly from housing 43 on handle 22. A set screw 44, shown in FIG. 4, is used to secure the bit in the socket. A coil spring 46 extends about the socket to take up any free play. The bit has a replaceable tip 41 secured in place by a c-clip 43. Although in this example a screwdriver tip is employed, an Allen wrench, a smaller socket or other such tool may be substituted depending upon the nature of the male threaded member used for adjustment purposes on the rocker arm.

Figure 3:
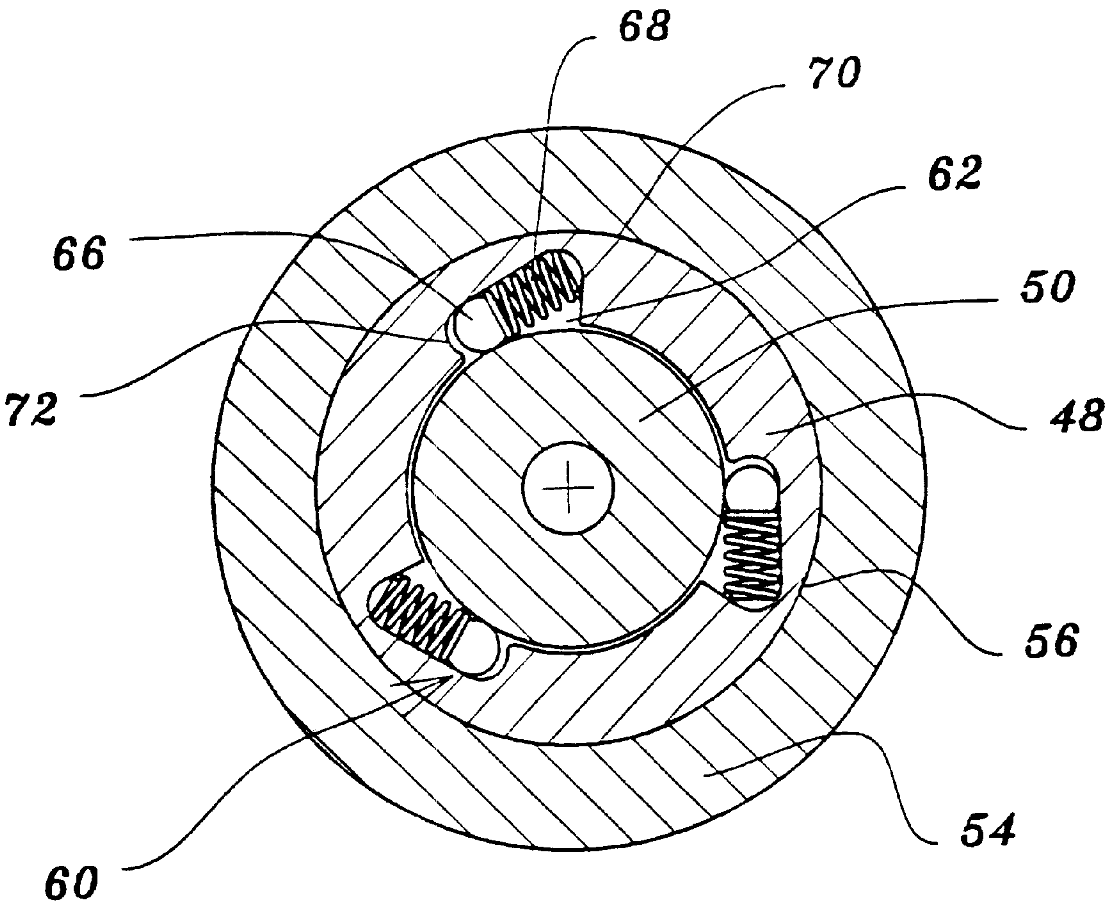
FIG. 3 is a sectional view taken a long line 3—3 of FIG. 2.

In this embodiment the socket 42 is integral with an annular member 48 shown in FIGS. 2, 3 and 4. There is a cylindrical member 50 located on bottom end 52 of the knob 30 and radially spaced-apart from its outer rim 54. The annular member 48 is rotatably received in annular gap 56 between the rim 54 and the cylindrical member 50.

There is a one-way cam mechanism 60, best shown in FIG. 3, operatively disposed between the cylindrical member 50 and the annular member 48. The annular member has a plurality of pockets or recesses 62, three in number in this example. They are 120 degrees apart in this embodiment although the number and spacing of recesses could vary. Each recess is provided with a roller 66 biased to one end of the recess by a coil spring 68. It may be seen that one and 70 of the recess is deeper than the opposite end 72 where the roller is located. In addition each coil spring 68 is acutely angled towards a tangent with the cylindrical member. The result is that when the knob 30, with its cylindrical member 50, are rotated clockwise, with reference to FIG. 3, relative rotational movement of the cylinder 50, and attached knob 30, is permitted relative to annular member 48 which is non-rotatably connected to the screwdriver bit 40. However, when the knob 30 is turned in the opposite direction, namely counter clockwise, annular member 48 and cylindrical member 50 lock, insuring that the screwdriver bit rotates exactly the same amount as the knob without any slippage.

There is a replaceable ring 76 near the top of the knob which is calibrated with the scale 78 appropriate for a particular engine. There is a transparent housing 80 within the ring. The magnetic needle 82 is freely, rotatably mounted in the transparent housing 80. It is kept at a fixed rotational position relative to the tool, as illustrated in FIG. 1, by a magnet 86 mounted on handle 22.

There is a clutch assembly 90 within the annular gap 56 of the knob 30 which is operatively disposed between the knob and annular member 48, particularly top 92 thereof. The clutch, as seen best in FIG. 4, includes a pair of Bellville washers 94 and three flat washers 96 in this example. The washers are fitted between the top 92 of the annular member 48 and inner end 98 of annular gap 56 in the knob shown in FIG. 2.

There is a mechanism, shown generally at 100, for adjusting friction in the clutch assembly. This includes a crown gear 102 with a male threaded member 104 extending downwardly and centrally therefrom as seen in FIG. 4. The threads in the member 104 are received in a female threaded aperture 106 in the cylindrical member 42 connected to the annular member 48 as shown in FIG. 4. There is a worm gear 110 with an Allen head 112 extending rotatably through an aperture 114 in the knob 30. The crown gear is rotatably supported on an annular bearing member 120 within the knob. Rotation of the worm gear, via the Allen head 112 in one direction, rotates the crown gear 102 clockwise and thus compresses the annular bearing member 120 towards the top 92 ofthe annular member, with the washers 94 and 96 therebetween. This increases friction in the clutch and thus the maximum amount of torque which can be applied to the screwdriver bit 40 by the knob 30 before the clutch slips. Rotation of the Allen head in the opposite direction decreases friction in the clutch and thus decreases the maximum torque.

Handle 22, as best seen in FIG. 5, has a housing 43 with a top 132 secured in place by up a plurality of bolts 134. There is an optical encoder 140 mounted in the housing. In this example a U.S. digital E2-256-375 encoder is used although other rotational sensors could be substituted. The digital encoder used in this example produces 1024 pulses per revolution. It is an incremental shaft encoder and a noncontacting rotary to digital position feedback device. It has an internal monolithic electronic module which converts the real-time shaft angle, speed and direction into TTL-compatible outputs. The encoder has a sensor head 141, shown in FIG. 4, fixedly mounted in housing 43. A disk 143 is non-rotatably mounted on bit 40 by a set screw 151. Washers 149 and clip 153 extend about the bit on either side of the disk.

In order to calculate the direction and distance traveled, the encoder pulses and phase must be counted and decoded. This is accomplished in this example by HTCL2016 decoding chip 176 which is located within display apparatus 32. This chip checks the phase and number of pulses to determine the count up or down and adjusts the output counter value accordingly. The output counter value is two bytes long and is read by the micro-processor one byte at a time.

Keypad 150 is a Grayhill 88BA2 4×4 sealed keypad in this example. It is modified to permit the last row of keys to be interpreted as a system reset. To interface the keypad to the micro-processor, a National Semiconductor MM74C922 16-key encoder is employed.

A XiCOR X250640 serial EEPROM memory is employed in this example to store the various engine manufacturer's clearance data. The serial memory is programmed externally by connecting a programming board to the parallel port of a personal computer. The data to be programmed must be in a specific format for this particular embodiment. One example follows:

Cat Type,0001,0012,0123

Next ,01 80,0360,0270

The clearance values are decimal number values and are the number of degrees of rotation required to achieve the desired valve clearance. The first eight characters are the engine identification, entered as they will appear on the LCD panel. These eight character locations are then followed by a comma and then the clearances (in degrees) for the inlet valve, the exhaust valve and the compression release brake. Each clearance value in this example must be four digits in length and separated by a comma The last value has no comma but is followed by a carriage return.

The display panel 36 in this example is an Optrex DMC-16433 backlit LCD panel which displays the menus and clearance information. The microprocessor sends an eight-bit word for each character to be displayed. A NEL-D32-46 inverter is used to supply the backlight for the panel.

In this example power is supplied by four AA batteries 168 which can deliver 7.5–14 V DC.

Operation

It should be understood that the mechanical components of tool 20 are capable of operating independently of the electronic components. Thus, the tool could be built without the electronic components and operate simply by using magnetic needle 82 and scale 78 on the knob. The lock nut on the rocker arm is loosened, using socket 24 and handle 22. Screwdriver bit 40 is fitted on the rocker arm screw and the knob 30 is rotated clockwise until the clutch assembly 90 slips, indicating that the screw has bottomed out against the valve. As discussed above, the amount of torque applied to the screw can be adjusted by rotating Allen head 112 connected to worm gear 110. Disk-type clutch 90 slips smoothly and cam device 60 allows easy relative rotation between cylindrical member 50 connected to the knob and annular member 48 connected to the screwdriver bit. No backlash is encountered as with ratchet-type one-way devices.

After the screw bottoms out against the valve, the mechanic continues to rotate the housing 80 clockwise until the end of needle 82 is aligned with a zero point marked on the scale 78. The mechanic then rotates knob 30 counter clockwise. The cam mechanism 60 causes the annular member 48, connected to the screwdriver bit, to lock relative to cylindrical member 50 connected to the knob. Thus the screwdriver bit is rotated exactly the same amount as the knob. The mechanic aligns the end of the needle with the marking on the scale 78 corresponding to the required amount of rotation. The scale 78 can be calibrated in, for example, thousands of an inch, according to the particular pitch of the thread of the rocker arm screw. For example, if the adjusting screw has a pitch of 24 T.P.I.(threads per inch), the screw would move nearly 1/24 inches or 0.04166' per 360 degrees of rotation. Thus, by determining the thread pitch, whether SAE or metric, it becomes quite simple to compute how many degrees the screw must be rotated in order to obtain a linear movement of, for example, 0.010 or 0.020 inches.

Handle 22 of the illustrated electronic version has a zero button 160 shown in FIG. 1. The LCD displays the rotation of the screwdriver bit relative to handle 22. In the sample, the LCD displays this value in degrees from the zero point. The operation occurs with the tool in place on the adjustment screw of the rocker arm. The power button on the display apparatus 32 is pushed. The LED panel begins to flash. Any button in the last row of the panel is pressed to reset the system. The mechanic then presses 1. The lock nut is loosened using handle 22. The adjustment screw is then screwed in using knob 30 until the clutch slips, indicating that the screw has bottomed. The user then presses the zero button 160 on handle 22.

The LCD will then display:

ROTATED=±0000°

Any movement of the screwdriver shaft relative to the handle will be displayed in degrees; on the LCD. A "+" indicates the rotation is counter clockwise from the zero point and a "−" indicates rotation is counter clockwise.

It is also possible to operate the device in an Engine Type mode where the engine type and clearance type will automatically display the desired and actual clearances for the particular model of engine. With the tool in place on the adjustment screw, the procedure is as follow:

1. Press the power button. The LED will begin to flash.
2. Press any button on the last row to reset the system.
3. Press 2.
4. Select the desired engine manufacturer.
5. Scroll through the available models by pressing the ^ key.
6. Press the B key to accept the displayed model.
7. Select the desired clearance to be set (Inlet, Exhaust, Compression Relief Brake).
8. Loosen the lock nut.
9. Using the slip clutch knob 30, screw in the adjustment screw until it just bottoms.
10. Press the zero button 160 on the tool handle. The LCD will now display:

| | |
|---|---|
| MODEL | (type of adjustment) |
| ACTUAL = | ±0000° |
| DESIRED = | (spec. value) |
| x.xx mm | x.xx" |

Any movement of the screwdriver shaft relative to the handle will be displayed in degrees on the LCD. A "+" indicates the rotation is counter clockwise from the zero point and a "−" indicates rotation is clockwise.

11. Rotate the slip clutch knob 30 until the desired value and actual values are the same.

12. Hold the knob still and tighten the lock nut.

As discussed above, the handle 22 is generally similar to a standard torque wrench and includes a rotatable grip 201 for adjusting the torque. The lock nut can be tightened to the required torque using the handle until it clicks in the standard way.

It will be understood by someone skilled in the art that many of the details provided above are by way of example only and can be altered or deleted without departing from the scope of the invention as set out in the following claims.

What is claimed is:

1. A valve adjusting tool for an internal combustion engine having a valve opening member with a male threaded member operatively and adjustably contacting the valve, the tool comprising:

a first member engagable with the threaded member for rotating the threaded member towards or away from the valve;

means for rotating the first member in a first rotational direction so the male threaded member moves towards the valve and for rotating the first member in a second rotational direction so the male threaded member moves away from the valve;

means for stopping movement of the first member, as the male threaded member moves towards the valve, when the male threaded member operatively contacts the valve and takes up play between said valve opening member and the valve; and means for measuring a predetermined amount of rotation of the male threaded member, as the male threaded member is rotated in the second rotational direction away from the valve, after having operatively contacted the valve, and thereby setting a specified amount of play between said valve opening member and the valve, wherein the means for stopping movement includes a clutch.

2. A tool as claimed in claim 1, including means for locking the clutch when the threaded member is rotated in the second rotational direction to prevent slippage between the first member and the means for rotating the first member.

3. A tool as claimed in claim 2, wherein the means for locking includes a cam device.

4. A tool as claimed in claim 3, wherein the cam device includes an outer annular member, an inner cylindrical member within the annular member, rollers and means for resiliently biasing the rollers between the members.

5. A tool as claimed in claim 4, wherein the annular member has a plurality of recesses adjacent to the cylindrical member, the rollers being within the recesses.

6. A tool as claimed in claim 5, wherein the means for biasing includes a coil spring in each said recess.

7. A tool as claimed in claim 6, wherein each coil spring is angled acutely towards the cylindrical member with respect to a tangent of the cylindrical member.

8. A tool as claimed in claim 7, wherein the recesses are equally spaced-apart about the cylindrical member.

9. A tool as claimed in claim 4, wherein the outer annular member is operatively connected to the first member and the inner cylindrical member is operatively connected to the means for rotating the first member.

10. A tool as claimed in claim 9 wherein the clutch includes a plurality of friction plates between the annular member and the means for rotating the first member.

11. A tool as claimed in claim 1 wherein the clutch includes a plurality of friction plates.

12. A tool as claimed in claim 11 wherein the friction plates are annular.

13. A valve adjusting tool for an internal combustion engine having a valve opening member with a male threaded member operatively and adjustably contacting the valve, the tool comprising:

a first member engagable with the threaded member for rotating the threaded member towards or away from the valve;

means for rotating the first member in a first rotational direction so the male threaded member moves towards the valve and for rotating the first member in a second rotational direction so the male threaded member moves away from the valve;

means for slopping movement of the first member, as the male threaded member moves towards the valve, when the male threaded member operatively contacts the valve and takes up play between said valve opening member and the valve; and means for measuring a predetermined amount of rotation of the male threaded member, as the male threaded member is rotated in the second rotational direction away from the valve, after having operatively contacted the valve, and thereby setting a specified amount of play between said valve opening member and the valve, including a handle, the means for rotating being rotatably mounted on the handle, the means for measuring the predetermined amount of rotation including a magnetic needle rotatably mounted on the means for rotating, a magnet on the handle for maintaining the needle at a fixed rotational position with respect to the handle and a dial on the means for rotating to indicate rotation of the means for rotating relative to the needle.

14. A tool as claimed in claim 13, wherein the means for rotating includes a knob.

15. A valve adjusting tool for an internal combustion engine having a valve opening member with a male threaded member operatively and adjustably contacting the valve, the tool comprising:

a first member engagable with the threaded member for rotating the threaded member towards or away from the valve;

means for rotating the first member in a first rotational direction so the male threaded member moves towards the valve and for rotating the first member in a second rotational direction so the male threaded member moves away from the valve;

means for stopping movement of the first member, as the male threaded member moves towards the valve, when the male threaded member operatively contacts the valve and takes up play between said valve opening member and the valve; and means for measuring a predetermined amount of rotation of the male threaded member, as the male threaded member is rotated in the second rotational direction away from the valve, after having operatively contacted the valve, and thereby setting a specified amount of play between said valve opening member and the valve, wherein the means for measuring the predetermined amount of rotation includes an electronic sensor.

16. A tool as claimed in claim 15, wherein the sensor includes an optical encoder, a microprocessor and an electronic readout.

* * * * *